United States Patent
Rao et al.

[19]

[11] Patent Number: 5,936,588
[45] Date of Patent: Aug. 10, 1999

[54] RECONFIGURABLE MULTIPLE BEAM SATELLITE PHASED ARRAY ANTENNA

[76] Inventors: Sudhakar K. Rao, 20326 Mansel Ave., Torrance, Calif. 90503; Parthasarathy Ramanujam, 2601 Fisk La., Redondo Beach, Calif. 90278; Robert E. Vaughan, 1659 5$^{TH}$ Street, Manhattan Beach, Calif. 90266; Philip H. Law, 17092 Escalon Dr., Encino, Calif. 91436

[21] Appl. No.: 09/092,511

[22] Filed: Jun. 5, 1998

[51] Int. Cl.$^6$ .................................................. H01Q 3/24
[52] U.S. Cl. ........................... 343/754; 343/853; 342/372
[58] Field of Search .................. 343/753, 754, 343/755, 772, 850, 853, 909; 342/371, 372, 373; H01Q 3/24, 19/06

[56] References Cited

U.S. PATENT DOCUMENTS

| | | | |
|---|---|---|---|
| 4,087,822 | 5/1978 | Maybell et al. | 343/778 |
| 4,381,509 | 4/1983 | Rotman et al. | 343/754 |
| 4,408,205 | 10/1983 | Hockham | 343/754 |
| 4,799,065 | 1/1989 | Thompson | 343/779 |
| 4,845,507 | 7/1989 | Archer et al. | 343/754 |
| 4,965,587 | 10/1990 | Lenormand et al. | 342/372 |
| 4,965,588 | 10/1990 | Lenormand et al. | 342/372 |
| 5,003,315 | 3/1991 | Skatvold | 343/754 |
| 5,115,248 | 5/1992 | Roederer | 342/373 |
| 5,289,193 | 2/1994 | Lenormand et al. | 342/373 |
| 5,329,248 | 7/1994 | Izadian | 330/295 |
| 5,495,258 | 2/1996 | Muhlhauser et al. | 343/753 |

*Primary Examiner*—Don Wong
*Assistant Examiner*—Tho Phan
*Attorney, Agent, or Firm*—Terje Gudmestad; Georgann Grunebach; Michael W. Sales

[57] ABSTRACT

A reconfigurable multiple beam phased array antenna has radiating elements arranged in a planar array and variable phase shifters. Each one of the phase shifters is connected to a respective one of the radiating elements. The array antenna further includes a beam forming network for forming spot and regional beam signals. The beam forming network forms a regional beam signal from a combination of spot beam signals. The beam forming network has two dimensional stacks of Rotman lenses provided with a first set of ports. Each one of the first set of ports is connected to a respective one of the radiating elements with. The Rotman lenses generate frequency invariant spot beam signals which are communicated between the radiating elements and the Rotman lenses via the first set of ports for transmission and reception of spot beams and regional beams by the radiating elements. The phase shifters are adjusted to steer the spot and regional beams to desired locations.

21 Claims, 5 Drawing Sheets

RECONFIGURABLE MULTIPLE BEAM SATELLITE PHASED ARRAY ANTENNA

TECHNICAL FIELD

The present invention relates generally to phased array antennas and, more particularly, to reconfigurable multiple beam phased array antennas employing Rotman lenses as beamformers.

BACKGROUND ART

The advent of wireless forms of communication necessitated the need for antennas. Antennas are required by communications and radar systems, and depending upon the specific application, antennas can be required for both transmitting and receiving signals. Early stages of wireless communications consisted of transmitting and receiving signals at frequencies below 1 MHz which resulted in signal wavelengths greater than 0.3 km. A problem with such relatively large wave-lengths is that if the size of the antenna is not at least equal to the wavelength, then the antenna is not capable of directional transmission or reception. In more modern forms of wireless communications, such as with communications satellites, the frequency range of transmitted signals has shifted to the microwave spectrum where signal wavelengths are in the 1.0 cm to 30.0 cm range. Therefore, it is practical for antennas to have sizes much greater than the signal wavelength and achieve highly directional radiation beams.

Many antennas have requirements for high directivity, high angular resolution, and the ability to electronically scan or be reconfigured. These functions are typically accomplished using a phased array antenna. A phased array antenna includes a collection of radiating elements closely arranged in a predetermined pattern and energized to produce beams in specific directions. When elements are combined in an array, constructive radiation interference results in a main beam of concentrated radiation, while destructive radiation interference outside the main beam reduces stray radiation. To produce desired radiation patterns, each individual radiating element is energized with the proper phase and amplitude relative to the other elements in the array.

In satellite communications systems, signals are typically beamed between satellites and fixed coverage region(s) on the Earth. With the expanding applications of satellites for many different aspects of communications, market requirements are continuously changing. Accordingly, a satellite must be capable of adapting to changes in the location of the requests for service. Thus, antennas provided on satellites must be capable of reconfigurable coverages.

A reconfigurable multiple beam phased array antenna is an ideal solution to the ever changing beam coverage requirements. Beam coverage can be in the form of a number of spot beams and regional beams located over specific regions. Spot beams cover discrete and separate areas such as cities. Regional beams cover larger areas such as countries. Regional beams are generated by combining a plurality of spot beams. Spot beams are generated by energizing the radiating elements with selected amplitudes and phases. A reconfigurable multiple beam phased array antenna should be capable of reconfiguring the location of the beams, the size of the beams, and the power radiated in each beam.

A problem with prior art reconfigurable multiple beam phased array antennas is that they deal with uniform sized beams and employ a large number of phase shifters which are used to steer the beams. The number of phase shifters is typically the number of elements multiplied by the number of beams. Further, the prior art reconfigurable multiple beam phased array antennas have limited bandwidth due to frequency scanning of the beams. The limited bandwidth causes the antenna gain and the co-channel interference (C/I) to degrade.

What is needed is a reconfigurable multiple beam phased array antenna in which beam locations are independent of frequency and, as a result, wider bandwidths can be achieved. To satisfy this need, the present invention provides a reconfigurable multiple beam phased array antenna employing a two dimensional stack of Rotman lenses in a low level beam forming network.

A Rotman lense is an inherently broadband beam former for linear, planar, and conformal microwave phased array antennas. The Rotman lense has been described in the technical literature including the paper "Wide-Angle Microwave Lens for Line Source Applications" by W. Rotman and R. F. Turner, published in the IEEE Transactions on Antennas and Propagation, Vol. AP-11, pp. 623–632 (1963). Other descriptions with additional information on the Rotman lense and its applications include the paper "Lens-Fed Multiple-Beam Arrays" by Donald Archer published in the Microwave Journal, Vol. 18, October 1975, pp. 37–42; and a paper entitled "Microstrip and Triplate Rotman Lenses" by A. Y. Niazi, M. S. Smith and D. E. N. Davis, published by Microwave Exhibitions and Publishers, Sevenoaks, Kent, England, in the Conference Proceedings—Military Microwaves "80".

SUMMARY OF THE INVENTION

Accordingly, it is an object of the present invention to provide a reconfigurable multiple beam phased array antenna having a low level beamforming network including two dimensional stacks of Rotman lenses which enable frequency independent beam scanning of the array.

It is another object of the present invention to provide a reconfigurable multiple beam phased array antenna having a low level beamforming network including two dimensional stacks of Rotman lenses which generate frequency invariant multiple spot beam signals.

It is a further object of the present invention to provide a reconfigurable multiple beam phased array antenna which generates beams of varying sizes such as spot and regional beams as required by future satellite systems supporting a number of services with different data rates from a single satellite.

It is still another object of the present invention to provide a reconfigurable multiple beam phased array antenna using a number of phase shifters each connected to a corresponding one of the array elements for steering beams to different orbital locations with the number of phase shifters being limited to the number of elements.

It is still a further object of the present invention to provide a reconfigurable beam phased array antenna which uses all the beams from two dimensional stacks of Rotman lenses to reconfigure regional beams.

In carrying out the above objects and other objects, the present invention provides a reconfigurable beam phased array antenna. The array antenna includes a plurality of radiating elements arranged in a planar array and a plurality of variable phase shifters. Each one of the plurality of variable phase shifters is connected to a respective one of the plurality of radiating elements.

The array antenna further includes a fixed passive beam forming network for forming spot beam signals and a reconfigurable active beamforming network for forming regional beam signals. The reconfigurable beam forming network forms regional beam signals from a combination of spot beam signals. The fixed beam forming network has two dimensional stacks of Rotman lenses provided with a first set of ports. Each one of the first set of ports is connected to a respective one of the plurality of radiating elements. The respective one of the plurality of variable phase shifters is interposed therebetween. The two dimensional stacks of Rotman lenses generate frequency invariant spot beam signals which are communicated between the radiating elements and the two dimensional stacks of Rotman lenses via the first set of ports for transmission and reception of spot beams and regional beams by the plurality of radiating elements. The phase shifters are adjusted to steer the spot beams and the regional beams to desired locations.

The advantages accruing to the present invention are numerous. The present invention has the flexibility to reconfigure spot and regional beams to different orbital locations of a satellite and to reconfigure the beams to different service regions from a single orbital location. In essence, the present invention allows for a common antenna design for various orbital locations/coverage regions and for multiple non-uniform coverage beams thereby reducing the non-recurring design and development cost of future satellites. By employing two dimensional stacks of Rotman lenses in the beam forming network, the beam locations are independent of frequency and hence wider bandwidths can be achieved.

These and other features, aspects, and embodiments of the present invention will become better understood with regard to the following description, appended claims, and accompanying drawings.

BEST MODES FOR CARRYING OUT THE INVENTION

Figure 1:
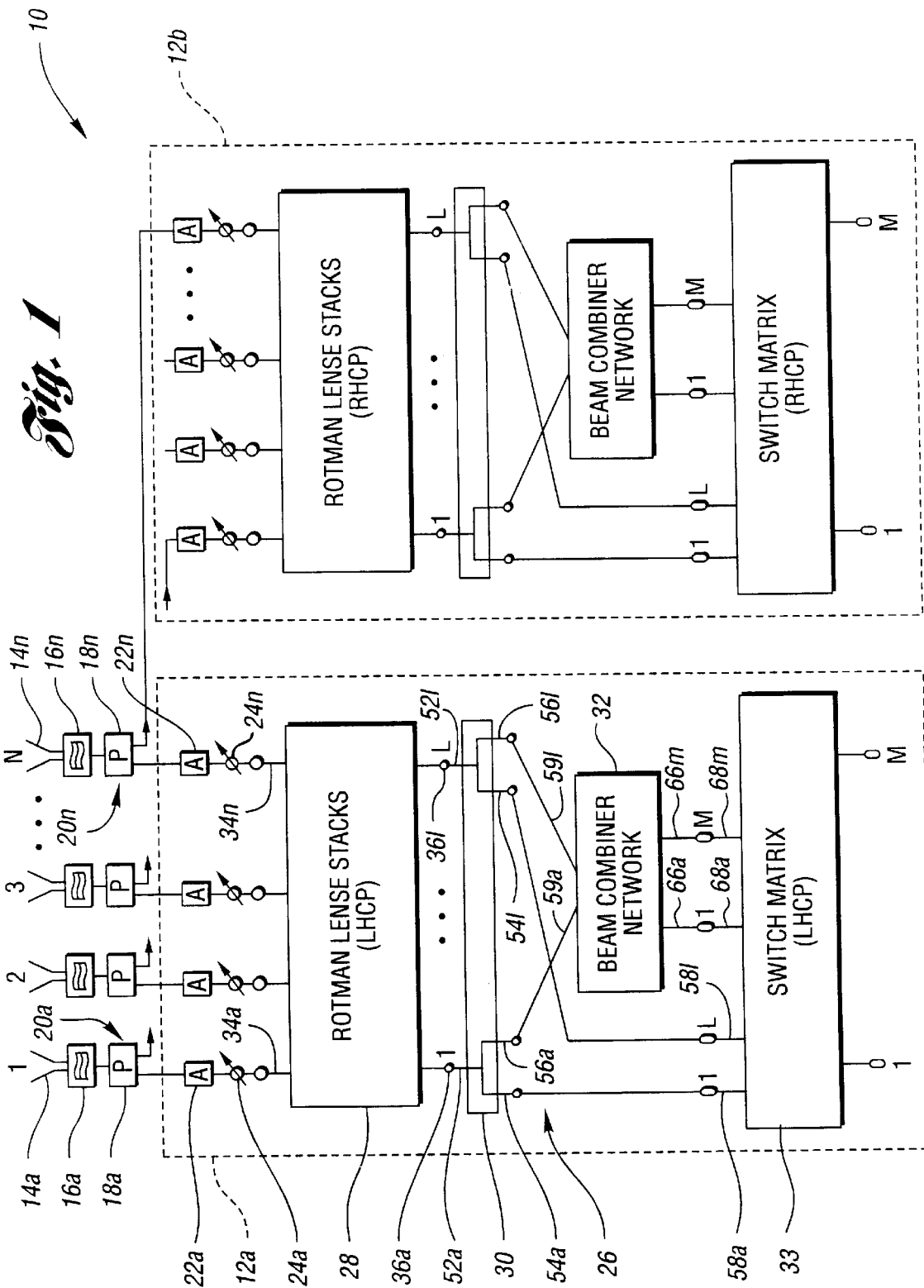
FIG. 1 is a general block diagram of a reconfigurable multiple beam phased array antenna according to a first embodiment of the present invention.

Referring now to FIG. 1, a reconfigurable multiple beam phased array antenna 10 according to a first embodiment of the present invention is shown. Array antenna 10 is operable for both transmitting and receiving beams simultaneously or intermittently and is intended for use on a satellite (not specifically shown in FIG. 1). Array antenna 10 includes left and right hand circular polarization antenna subsystems 12a and 12b connected to N radiating elements 14(a–n) by respective bandpass filters 16(a–n) and polarizers 18(a–n) along separate individual feed chains 20(a–n). Radiating elements 14(a–n) are preferably horns arranged in a hexagonal grid geometry of a planar array by itself or feeding a dual-reflector imaging antenna with confocal paraboloids (not specifically shown). Because subsystems 12a and 12b include the same elements, only antenna subsystem 12a will be described in further detail.

Figure 2A:
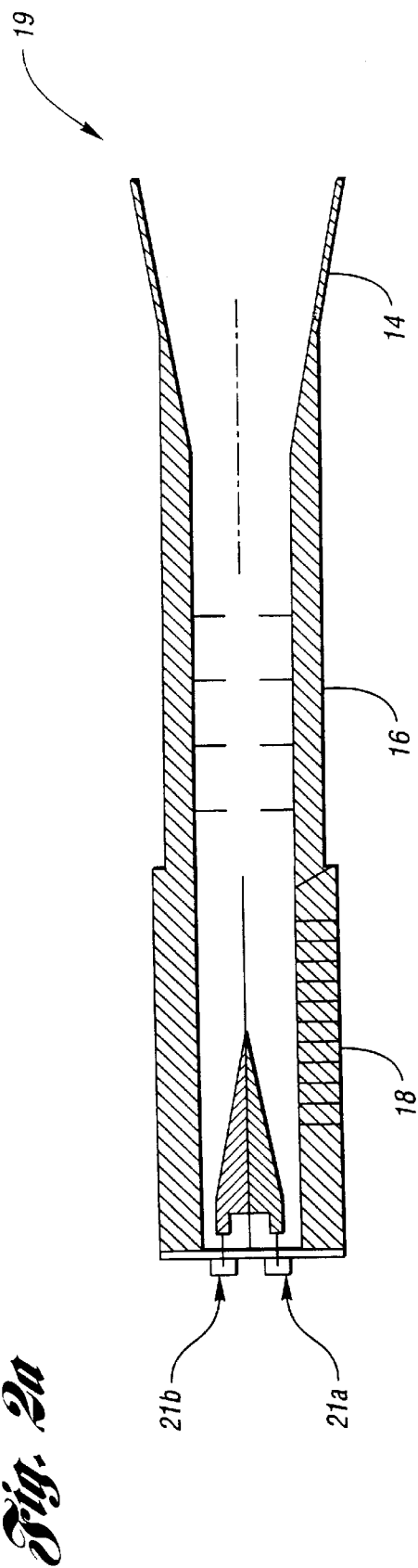
FIG. 2A is a cross sectional view of an integrated feed assembly.
Figure 2B:
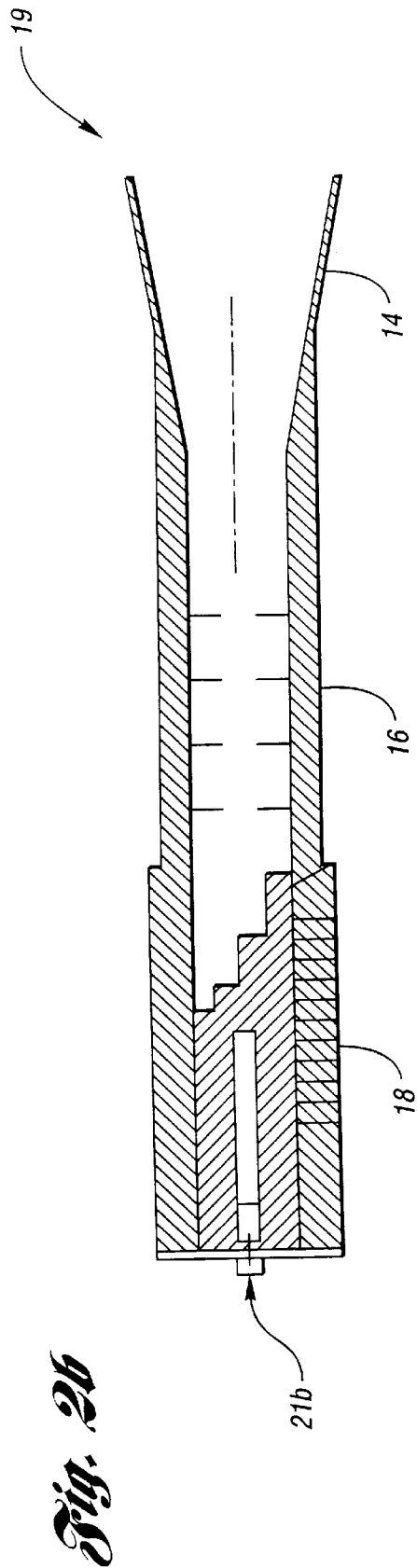
FIG. 2B is a cross sectional view of the integrated feed assembly shown in FIG. 2A rotated by 90°.

Referring briefly to FIGS. 2A and 2B, radiating element 14, bandpass filter 16, and polarizer 18 are preferably combined in an integrated feed assembly 19 as shown. Radiating element 14 may be a circular horn such as a Potter horn or a dominant $TE_{11}$ mode horn. Bandpass filter 16 is an iris filter for rejecting transmitting ($T_x$) or receiving ($R_x$) frequencies. Polarizer 18 is preferably a septum polarizer. Integrated feed assembly 19 further includes a pair of transitions 21(a–b) for receiving left and right hand circular polarization signals from antenna subsystems 12a and 12b, respectively.

Referring now back to FIG. 1, each of feed chains 20(a–n) is connected to a corresponding one of N amplifiers 22(a–n) and N phase shifters 24(a–n). Amplifiers 22(a–n) and phase shifters 24(a–n) act together to energize their associated radiating element 14(a–n) with a signal having a selected amplitude and phase relative to the other elements. As a result, generated beams can be steered to different orbital locations by adjusting the level of amplification of amplifiers 22(a–n) and the level of phase shifting of phase shifters 24(a–n). Typically, the level of amplification is the same for each of amplifiers 22(a–n) and the beams are steered by adjusting phase shifters 24(a–n). The power radiated in the beams can be varied by adjusting amplifiers 22(a–n).

Amplifiers 22(a–n) are distributed non-redundant amplifiers such as low noise amplifiers on receive mode and solid state power amplifiers on transmit mode. Phase shifters 24(a–n) are digitally controlled. In addition to steering the beams to different orbital locations, phase shifters 24(a–n) correct for satellite pointing errors on-orbit and phase variations in feed chains 20(a–n) caused by amplifiers 22(a–n), bandpass filters 18(a–n), and mutual coupling effects among radiating elements 14(a–n).

Antenna subsystem 12a further includes a low level beam forming network 26. Beam forming network 26 includes two dimensional stacks of Rotman lenses 28, a beam divider network 30, and a beam combining network 32. Beam forming network 26 is fully reciprocal and operates to excite radiating elements 14(a–n) to generate spot and regional beams in predetermined directions for both transmitting and receiving.

A switch matrix 33 is operable with beam forming network 26 to selectively feed energy to or sample energy from the beam forming network. In accord with the selection of beams by switch matrix 33, beam forming network 26 provides beam signals for discrete multiple excitation to form spot and regional beams, or conversely to separate receive signal energy into discrete corresponding beam signals in accordance with receiving spot and regional beam angles.

Beam forming network 26 forms beams in two stages. The first stage includes Rotman lense stacks 28. Rotman lense stacks 28 have element ports N 34(a–n) and L beam ports 36(a–l). Each of element ports 34(a–n) is connected to a respective one of feed chains 20(a–n) to feed individually phased energy discretely to radiating elements 14(a–n) on transmission and receive discretely phased information in accord with the beam directions of array antenna 10 on reception. Rotman lense stacks 28 include beam ports 36(a–l) for receiving and providing L spot beam signals based on the composite coverage of various orbital slots.

Figure 3:
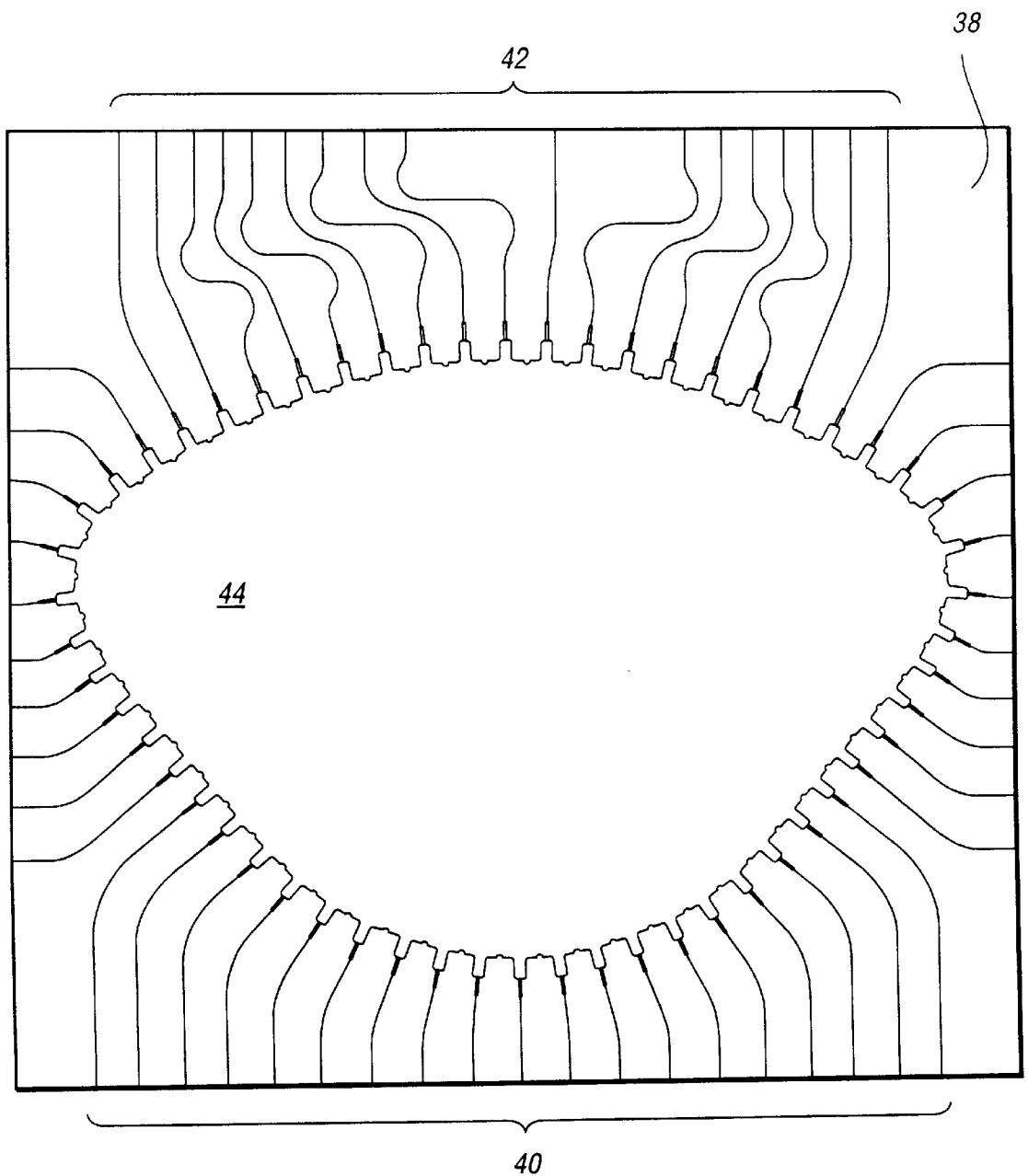
FIG. 3 is a diagram illustrating the geometry of an exemplary Rotman lense.

Referring now to FIG. 3 with continual reference to FIG. 1, an exemplary Rotman lense 38 is shown. Rotman lense 38 includes input beam ports 40, output element ports 42, and a number of dummy ports (not specifically shown). The dummy ports are terminated in matched loads to minimize internal reflections from lense cavity 44. Rotman lense 38 can be realized in either microstrip or stripline medium.

Figure 4:
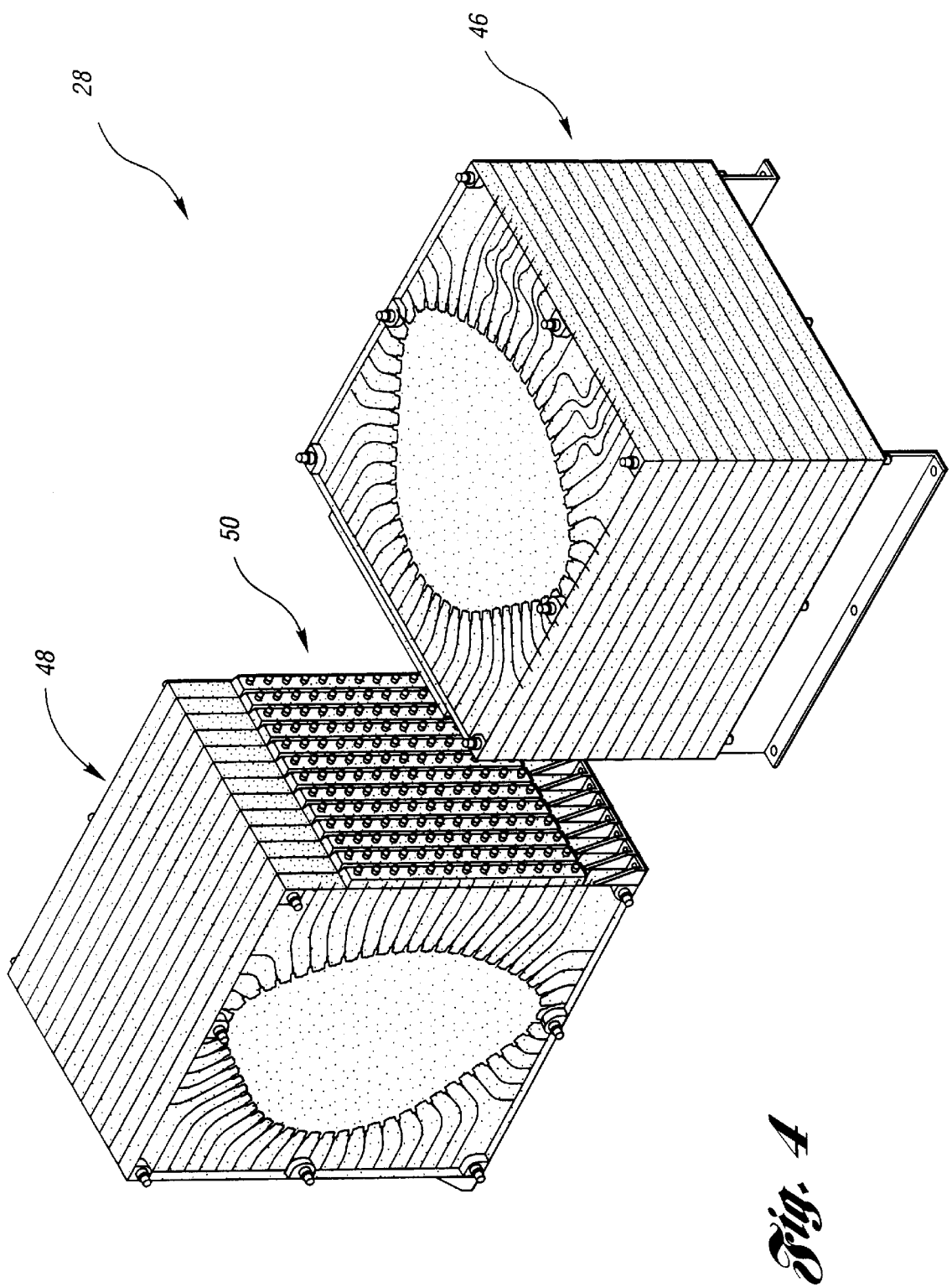
FIG. 4 is a perspective view of two dimensional stacks of Rotman lenses disconnected from one another.

Referring now to FIG. 4 with continual reference to FIG. 1. Rotman lense stacks 28 include horizontal and vertical stacks of lenses 46 and 48, respectively. Each lense of vertical stack of lenses 48 has interconnection ports 50 for connection with corresponding ports of horizontal stack of lenses 46 (not specifically shown in FIG. 4). These interconnections can be achieved by the use of radio frequency (RF) cables. One of stack of lenses 46 and 48 includes element ports 34(a–n) for connection with feed chains 20(a–n) (not specifically shown in FIG. 4). The other one of stack of lenses 46 and 48 includes beam ports 36(a–l) (not specifically shown in FIG. 4).

The number of lenses required for Rotman lense stacks 28 is about twice the square root of N, where N is equal to the number of radiating elements, for a square lattice. For a hexagonal lattice, about 2.31 multiplied by the square root of N lenses are required.

Rotman lense stacks 28 produce beam signals which are invariant of frequency. As a result, transmitted and received beam locations do not change with frequency over the operating frequency band. Rotman lense stacks 28 have this property because they realize the true-time delay (or phase) across radiating elements 14(a–n).

Referring now back to FIG. 1, the second stage of beam forming includes beam divider network 30 and beam combining network 32. Beam divider network 30 includes L ports 52(a–l) each connected to a corresponding one of beam ports 36(a–l) of Rotman lense stacks 28. Each of ports 52(a–l) is associated with a pair of L ports 54(a–l) and 56(a–l).

When array antenna 10 is in reception mode, L spot beam signals from beam ports 36(a–l) enter beam divider network 30 via ports 52(a–l). Beam divider network 30 divides each of the L spot beam signals into two signals at ports 54(a–l) and 56(a–l). The L spot beam signals from ports 54(a–l) are routed to a corresponding one of L switch ports 58(a–l) of switch matrix 33. The other L spot beam signals from ports 56(a–l) are routed to beam combining network 32 through corresponding ports 59(a–l). From the L spot beam signals, beam combining network 32 generates M regional beam signals.

Figure 5:
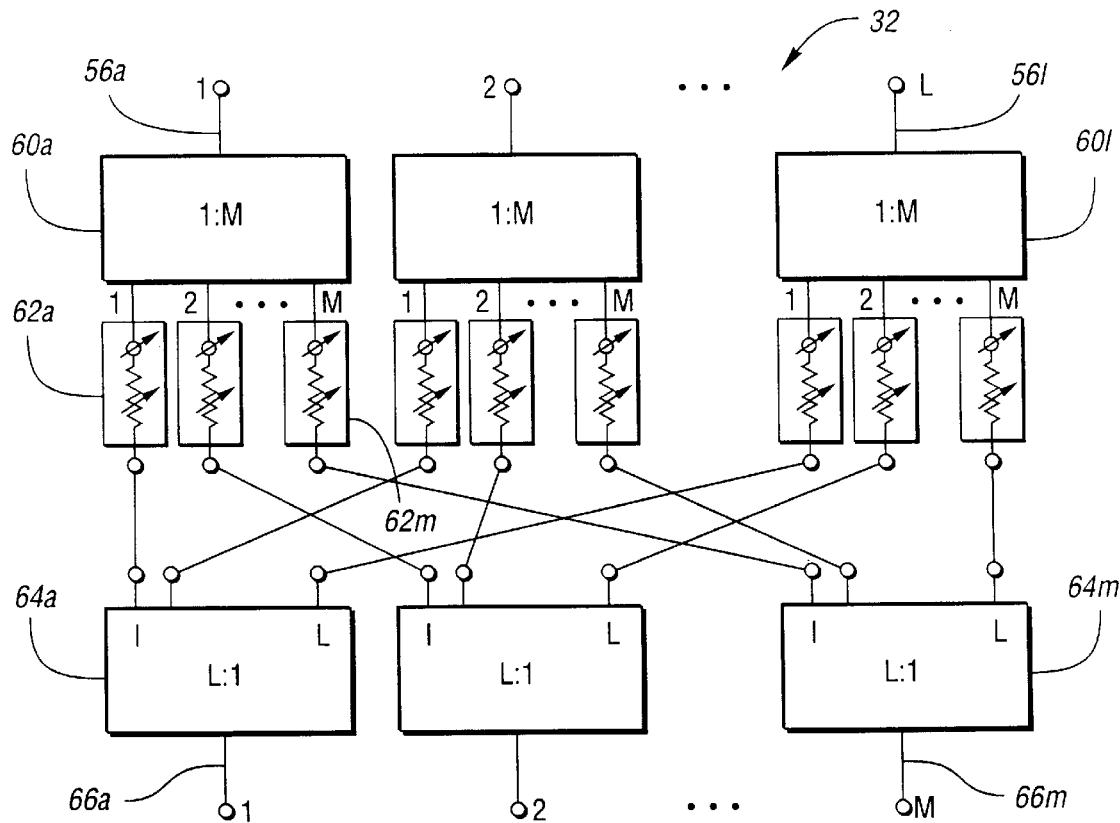
FIG. 5 is a block diagram of the beam combining network.

Referring now to FIG. 5 with continual reference to FIG. 1, beam combining network 32 includes L dividers (1:M) 60(a–l), M variable phase shifter and attenuator pairs 62(a–m) associated with each of the dividers, and M combiners (L:1) 64(a–m). Dividers 60(a–l) divide each of the L spot beam signals from ports 56(a–l) into M ways. Each of the divided M signals is routed to phase shifter and attenuator pairs 62(a–m). Phase shifter and attenuator pairs 62(a–m) vary the phase and amplitude of each of the divided M signals. Phase shifter and attenuator pairs 62(a–m) are active components and are employed to reconfigure the regional beams. Of course, beam combining network 32 can be completely passive for fixed regional beams and phase shifter and attenuator pairs 62(a–m) are not required.

Each of the phase shifted and attenuated divided M signals is then routed to a corresponding one of combiners 64(a–m). For instance, each of the phase shifted and attenuated divided M signals from the first phase shifter and attenuator pair 62a associated with each of dividers 60(a–l) is routed to the first combiner 64a. Similarly, each of the M signals from the second phase shifter and attenuator pair 62b is routed to the second combiner 64b. This process is continued until the M signals from the Mth phase shifter and attenuator pair 62m is routed to the Mth combiner 64m.

Combiners 64(a–m) combine the L signals from the phase shifter and attenuator pairs 62(a–l) to form M regional beam signals. The location and size of the M regional beams are completely reconfigurable by adjusting the phase shifter and attenuator pairs 62(a–m). The M regional beam signals are routed through ports 66(a–m) of beam combining network 32 to ports 68(a–m) of switch matrix 33.

From the L spot beam signals from ports 54(a–l) and the M regional beam signals from ports 66(a–m) switch matrix 33 selects desired beams out of the L+M beams. The desired beams are selected based on the orbital location of the satellite and on reconfigurability requirements.

When array antenna 10 is in transmission mode, the above described procedure is reversed. Switch matrix 33 selects desired beams out of the L+M beams for transmission. Spot beam signals from ports 58(a–l) are provided to ports 54(a–l) of beam divider network 30. Regional beam signals from ports 68(a–m) are provided to ports 66(a–m) of beam combiner network 32.

When array antenna 10 is in transmission mode, combiners 64(a–m) function as dividers and divide a regional beam signal into L ways. Each of the divided L signals from a combiner is routed to a corresponding one of the M phase shifter and attenuator pairs 62(a–m). Phase shifter and attenuator pairs 62(a–m) adjust the phase and amplitude of the signals and then route M signals to dividers 60(a–l). Each of the dividers 60(a–l) functions to combine the provided M signals into one signal. The signal from each of dividers 60(a–l) is then provided to ports 56(a–l) of beam divider network 30. Beam divider network 30 functions now as a combiner and combines the signals from ports 54(a–l) and 56(a–l). Ports 36(a–l) of beam divider network 30 provide the L combined signals to Rotman lense stacks 28. Rotman lense stacks 28 then forms the L spot beam signals for transmission.

The present invention is applicable to satellite based communication systems. It is particularly of interest to future communications satellites such as personal communication satellites (PCS), direct broadcast satellites (DBS) and mobile communications satellites involving a moderate to large number of multiple spot beams.

Thus it is apparent that there has been provided, in accordance with the present invention, a reconfigurable multiple beam phased array antenna that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Figure 6:
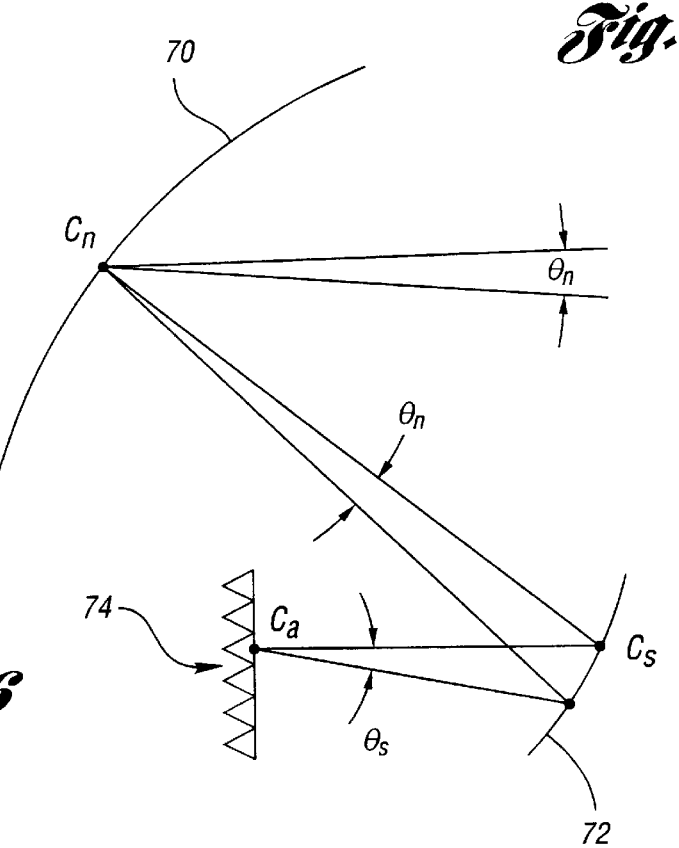
FIG. 6 is an illustration of a dual-reflector imaging antenna of a second embodiment of the present invention.

For instance, referring now to FIG. 6, in accordance with a second embodiment of the present invention, array antenna 10 employs a parabolic main reflector and a concave parabolic subreflector 72 with both reflectors having a common focal point. The planar array of radiating elements 74(a–n) at Ca forms an incident wave on subreflector 72 at Cs. Subreflector 72 is located in the near field of radiating elements 74(a–n) and transforms the approximated plane wave of the radiating elements into a magnified version using the confocal paraboloids. Thus, the size of the planar array of radiating elements 74 can be reduced by a magnification factor of Mf (Mf>1) where Mf is the magnification factor of the confocal system of reflectors 70 and 72 and thus, the number of radiating elements can be reduced by $Mf^2$ as compared to the number of radiating elements of the first embodiment of the present invention.

The magnification Mf is given by the ratio of the focal lengths of the main and subreflectors 70 and 72 which is equal to $\theta_s/\theta_n$. Radiating elements 74 needs to be scanned by Mf multiplied by the scan angle for the beam coverages. Typical values of Mf are in the range of two to three. Thus, the number of radiating elements are therefore reduced by at least a factor of four when compared to the direct radiating array of radiating elements of the first embodiment of the present invention.

What is claimed is:

1. A reconfigurable multiple beam phased array antenna comprising:

a plurality of radiating elements arranged in a planar array;

a plurality of variable phase shifters, each one of the plurality of variable phase shifters connected to a respective one of the plurality of radiating elements; and a beam forming network for forming spot beam signals and regional beam signals, wherein the beam forming network forms a regional beam signal from a combination of spot beam signals, the beam forming network having two dimensional stacks of Rotman lenses provided with a first set of ports, each one of the first set of ports connected to a respective one of the plurality of radiating elements with the respective one of the plurality of variable phase shifters interposed therebetween, wherein the two dimensional stacks of Rotman lenses generate frequency invariant spot beam signals which are communicated between the radiating elements and the two dimensional stacks of Rotman lenses via the first set of ports for transmission and reception of spot beams and regional beams by the plurality of radiating elements;

wherein the phase shifters are adjusted to steer the spot beams and the regional beams to desired locations.

2. The array antenna of claim 1 wherein the two dimensional stacks of Rotman lenses further include a second set of ports.

3. The array antenna of claim 2 further comprising:

a switch matrix operable with the beam forming network.

4. The array antenna of claim 3 wherein the beam forming network further comprises:

a beam divider network having a first set of ports each connected to a respective one of the second set of ports of the two dimensional stacks of Rotman lenses, the beam divider network further having a second set of paired ports associated with each port of the first set of ports of the beam divider network.

5. The array antenna of claim 4 wherein the beam forming network further comprises:

a beam combiner network having a first set of ports each connected to one of a respective one of the second set of paired ports of the beam divider network, the beam combiner network further having a second set of ports.

6. The array antenna of claim 5 wherein the beam divider network receives the frequency invariant spot beam signals from the two dimensional stack of Rotman lenses via the first set of ports and divides each spot beam signal into two separate spot beam signals during reception of spot beams and regional beams by the plurality of radiating elements, the beam divider network providing the respective divided spot beam signals on each port of its second set of paired ports associated with its first set of ports.

7. The array antenna of claim 6 wherein the divided spot beam signal on one port of each of the second set of paired ports of the beam divider network is received by the beam combiner network via the first set of ports of the beam combiner network.

8. The array antenna of claim 7 wherein the beam combiner network forms regional beam signals from the divided spot beam signals, wherein the beam combiner network provides each of the regional beam signals to a respective one of the second set of ports of the beam combiner network.

9. The array antenna of claim 8 wherein the divided spot beam signals on the other one port of each of the second set of paired ports of the beam divider network and the regional beam signals from the second set of ports of the beam combiner network are provided to the switch matrix, wherein the switch matrix selects the spot beams and the regional beams for reception.

10. The array antenna of claim 5 wherein the beam combiner network forms spot beam signals from regional beam signals provided to the beam combiner network from the switch matrix during transmission of spot beams and regional beams by the plurality of radiating elements.

11. The array antenna of claim 10 wherein the beam combiner network provides each of the spot beam signals to a corresponding one port of each of the second set of paired ports of the beam divider network.

12. The array antenna of claim 11 wherein the other one port of each of the second set of paired ports receives a spot beam signal from the switch matrix.

13. The array antenna of claim 10 wherein the beam divider network combines the spot beam signals from each port of the second set of paired ports and provides the combined spot beam signals to each of a corresponding one of the second set of ports of the two dimensional stacks of Rotman lenses.

14. The array antenna of claim 5 wherein the beam combiner network includes divider networks, variable phase shifter and attenuator pairs, and combiner networks for forming spot beam signals from the regional beam signals on reception and for forming regional beam signals from spot beam signals on transmission.

15. The array antenna of claim 1 wherein the plurality of radiating elements is a direct radiating array of circular horns.

16. The array antenna of claim 1 further comprising:

a main reflector and a subreflector operable with the plurality of radiating elements.

17. The array antenna of claim 1 further comprising:

a plurality of variable attenuators, each one of the plurality of variable attenuators connected to a respective one of the plurality of radiating elements interposed between the radiating elements and the beam forming network.

18. The array antenna of claim 17 wherein the variable attenuators include low noise amplifiers for amplifying received spot beam signals from the plurality of radiating elements.

19. The array antenna of claim 17 wherein the variable attenuators include solid state power amplifiers for amplifying transmitted spot beam signals from the two dimensional stacks of Rotman lenses.

20. The array antenna of claim 1 wherein the plurality of radiating elements are capable of transmitting and receiving circular polarized beam signals.

21. The array antenna of claim 1 wherein the two dimensional stacks of Rotman lenses include a vertical stack and a horizontal stack.

* * * * *